United States Patent [19]

Suuchi et al.

[11] Patent Number: 4,630,779
[45] Date of Patent: Dec. 23, 1986

[54] METHOD FOR DISCHARGING CONSOLIDATED WASTE CATALYST

[75] Inventors: Osamu Suuchi, Tokyo; Shuzo Mimaya; Masaru Ohashi, both of Okayama, all of Japan

[73] Assignee: Nippon Mining Co., Ltd., Tokyo, Japan

[21] Appl. No.: 761,719

[22] Filed: Aug. 2, 1985

[30] Foreign Application Priority Data

Aug. 2, 1984 [JP] Japan .................. 59-161527
Dec. 28, 1984 [JP] Japan .................. 59-274409

[51] Int. Cl.⁴ .................................. B02C 19/12
[52] U.S. Cl. ........................... 241/1; 422/184
[58] Field of Search ............ 241/1, 301; 422/144, 422/184, 232, 233

[56] References Cited

FOREIGN PATENT DOCUMENTS

| 27776 | 3/1975 | Japan . | |
|-------|--------|---------|---|
| 69652 | 6/1975 | Japan . | |
| 47747 | 5/1977 | Japan . | |
| 135053 | 8/1982 | Japan | 241/1 |
| 141276 | 8/1983 | Japan | 241/1 |
| 162687 | 9/1983 | Japan | 241/1 |

OTHER PUBLICATIONS

17398, European Patent Application (EPA), 10-1980.

Primary Examiner—Mark Rosenbaum
Attorney, Agent, or Firm—Sughrue, Mion, Zinn, Macpeak & Seas

[57] ABSTRACT

Consolidated waste catalyst is discharged from a reactor by forming at least one hole in it, then filling the hole with hydrative expansive fracturing agent in the presence of water, waiting until fracturing occurs and then discharging the fractured catalyst from the reactor.

8 Claims, 3 Drawing Figures

FIG.1
FIG.3
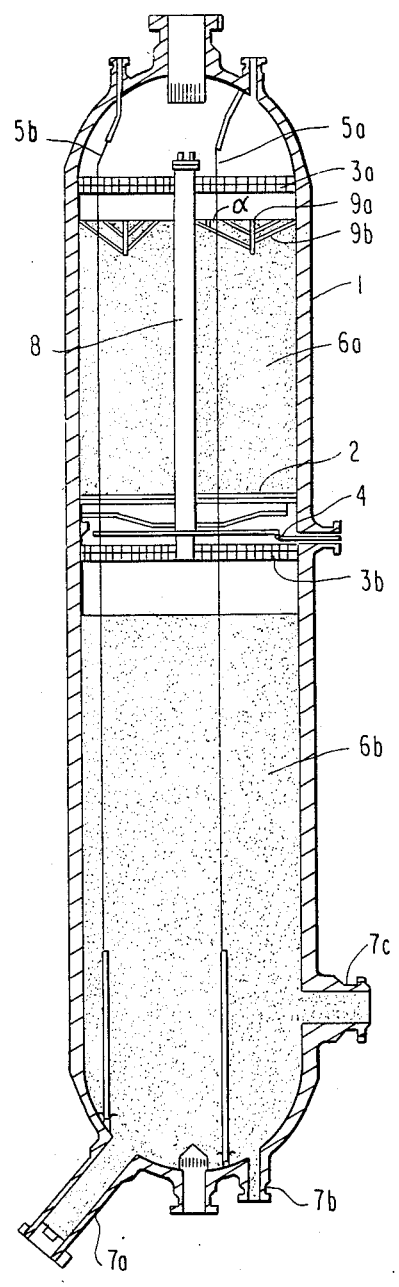
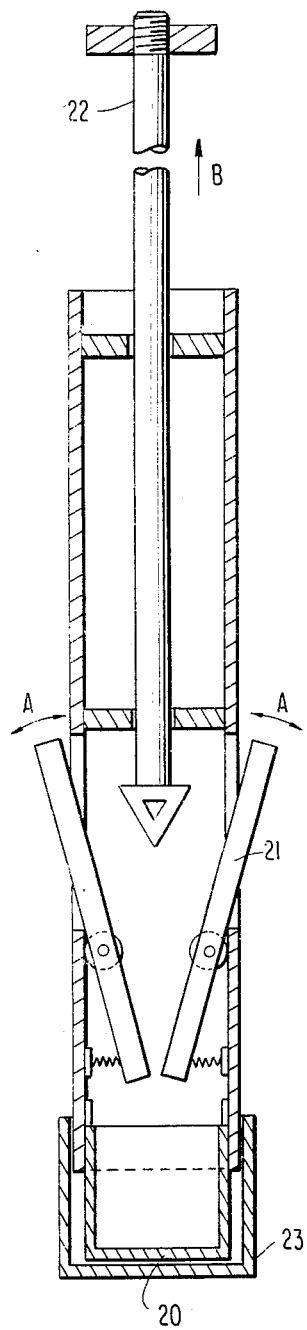

METHOD FOR DISCHARGING CONSOLIDATED WASTE CATALYST

FIELD OF THE INVENTION

The present invention relates to a method for discharging a consolidated spent or "waste" catalyst from a reaction vessel after gradual or progressive fracturing.

BACKGROUND OF THE INVENTION

In large reactors such as those used in heavy oil desulfurization, the reaction products such as coke and catalyst are often consolidated (i.e., form a coagulated mass) because of thermal or chemical effects that occur during the reaction, and such consolidated catalysts cannot be simply discharged from the bottom of the reactor. Conventionally, operators have to enter the reactor and crush the consolidated waste catalyst with a suitable machine to reduce the catalyst to sufficiently small pieces to enable them to be discharged from the reactor. It has been described that the waste catalyst can be crushed with an explosive, gunpowder, or an inflammable gas and air mixture that is charged into a hollow pipe and ignited to cause an explosion which will fracture the catalyst into sufficiently small pieces to enable them to be easily discharged from the reactor. See Japanese Patent Application (OPI) Nos. 27776/1975 and 69652/1975 and Japanese Patent Publication No. 47747/1977 (the term "OPI" as used herein refers to a "published unexamined Japanese patent application").

The use of a crushing machine involves considerable time in crushing the waste catalyst into small pieces and discharging them from the reactor. Furthermore, in order to avoid combustion and other chemical changes that would occur in the waste catalyst as a result of contact with air, the reactor must be sealed with an inert gas, which necessitates taking precautions to ensure safety and involves an inefficient operation.

On the other hand, the use of explosives, gunpowder, or a mixture of inflammable gas and air is a very effective method. However, great skill is required in determining the proper amount of explosive, etc., to be primed, and this method is not applicable to the waste catalyst around inner walls or accessories such as pipes and trays of the reactors which might be damaged by explosion. In addition, the fracturing operation cannot be started until the catalyst is completely cooled after the lapse of an extended period of time.

SUMMARY OF THE INVENTION

A principal object, therefore, of the present invention is to provide a safe, rapid and simple method of fracturing a consolidated waste catalyst, even a hot waste catalyst, and withdrawing the fractured catalyst from a reactor without damaging the inner walls or any accessories of the reactor.

As a result of extensive studies made in order to solve these problems, the present inventors have found that a consolidated waste catalyst can be effectively fractured by using expansive cements or other hydrative expansive fracturing agents instead of explosives, gunpowder, or mixtures of inflammable gases and air.

Thus, according to the present invention, there is provided a method for discharging a consolidated waste catalyst from a reactor, comprising the steps of (1) making one or more holes in the catalyst, (2) filling said hole(s) with a hydrative expansive fracturing agent in the presence of water, (3) leaving said catalyst to stand until it is fractured by said agent, and (4) discharging the fractured catalyst from the reactor.

If the waste catalyst is hot, hydrative expansive fracturing agents will normally undergo rapid reaction of hydration and will gush out of the hole(s) made in the catalyst. The inventors have found that this problem can be effectively avoided by charging the fracturing agents into the hole(s) in the catalyst as it is cooled, by a suitable means such as a heat pipe.

According to another finding of the present inventors, if the hydrative expansive fracturing agent at the open end of each hole in the catalyst is heated, rapid hydration occurs in that portion of the agent, which then expands and solidifies faster than the other portions to provide a "lid" that confines the agent within the hole(s) and effectively prevents its gushing out. By making use of this technique, even a hot catalyst can be fractured without completely cooling it.

BRIEF DESCRIPTION OF THE DRAWINGS

FIG. 1 is a side elevational section of a heavy oil desulfurizing reactor to which the method of the present invention can be applied.

FIG. 3 shows a longitudinal cross section of a device for heating the head of a hydrative expansive fracturing agent.

DETAILED DESCRIPTION OF THE INVENTION

Figure 2:
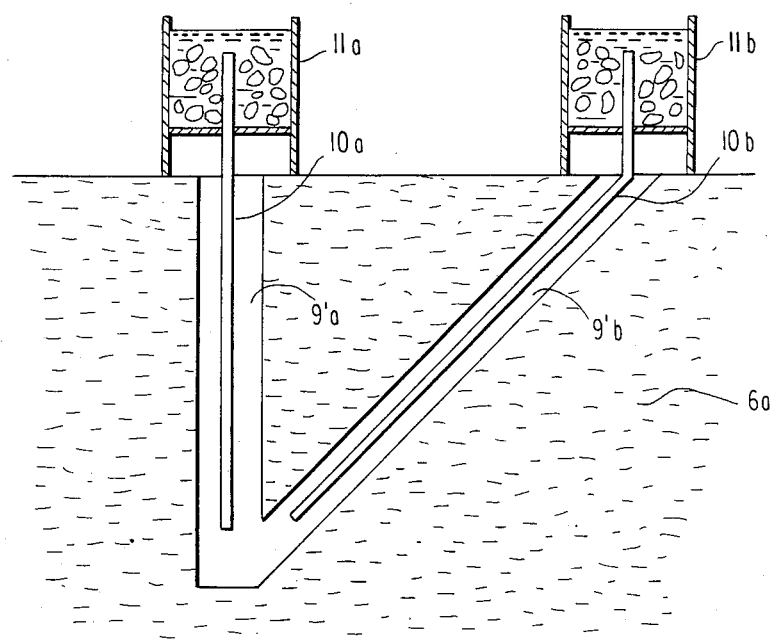
FIG. 2 is a sketch illustrating the concept of the present invention as applied to a hot consolidated waste catalyst.

The term "reactor" as used in this specification includes those reactors which use fixed beds filled with catalysts for performing a variety of catalytic reactions. Illustrative reactors include those which are commonly used in oil refineries for various processes, for example, hydrodesulfurization, hydroreforming, and hydrocracking of atmospheric fractions or vacuum fractions or heavy residues. In these reactors, the catalyst particles are consolidated by heavy metals in oil or the coke resulting from catalytic reactions. This phenomenon is particularly notable in the upper part of the catalyst bed into which the fluid of interest is supplied and which therefore is exposed to more hostile reaction conditions.

The hydrative expansive fracturing agent used in the method of the present invention is a substance which, when mixed with water, is hydrated to physically expand after the lapse of a certain period of time, thereby creating a sufficient expansive pressure to fracture the catalyst. Examples of the hydrative expansive fracturing agent that may be used in the invention include those which are based on silicates such a tricalcium silicate and expanding agents such as calcium oxide, as well as those which are generally referred to as "expansive cements", such as a cement which is mainly composed of lime, calcium sulfoaluminate, calcined dolomite, magnesia, normal portland cement-blast furnace slag-bauxite-gypsum mixtures, alumina cement-lime-gypsum mixtures or calcium aluminate-lime-gypsum mixtures.

In order to ensure ease of handling, these hydrative expansive fracturing agents are preferably used as cartridges wherein any of the expansive cements and other hydrative expansive fracturing agents listed above are packed in containers made of such water-permeable and expandable or rupturable materials as paper or porous plastic films.

A hole or holes can be made in the consolidated waste catalyst with such machines as drills or rock drills. The number and size of the hole to be made should be properly determined depending on the degree of consolidation and the size of the lumps. The hole(s) is then filled with hydrative expansive fracturing agents after it has been dipped in water or mixed with water.

If the catalyst temperature is high, the hydrative expansive fracturing agent is packed in the hole(s) as the catalyst is cooled with heat pipes inserted through the hole(s). In this case, an aqueous slurry of powdered fracturing agents is preferred over fracturing agents of the cartridge type. The heat pipes consist of copper or other metal pipes that are filled with water or other heat transfer liquid media, having an upper end which can be cooled.

Another method that can be used with a hot catalyst is to heat that portion of the hydrative expansive fracturing agent at the open end of each hole so that said portion will expand and solidifies faster than the other portions of the fracturing agent. In order to facilitate the heating operation, the fracturing agent is preferably charged into the hole(s) so that a small portion at the open end of each hole remains unfilled. After charging the fracturing agent, the head of the agent should be heated as soon as possible. The head must be heated to a temperature not lower than the point at which rapid expansion and solidification of the agent will occur. Such point will differ from one fracturing agent to another, but for most hydrative expansive fracturing agents, it suffices to heat them to 80° C. or higher. The head of the fracturing agent must be solidified before the other parts start to expand and solidify as a result of heat transfer from the surrounding waste catalyst. In order to meet this requirement, the head of the fracturing agent is preferably heated to a temperature appreciably higher than that of the catalyst. Such heating may be readily accomplished with the aid of a pyrogenic substance selected from among iron powder, iron monoxide powder, iron sulfide powder and other agents that generate heat upon oxidation, as well as quick lime, zeolites, and other agents that generate heat upon hydration or any other form of reaction with water. These pyrogenic substances are preferably enclosed with air- or water-permeable paper, plastic films, or aluminum foil and stored in a container until use, when the substance is taken out of the container and is either exposed to air or dipped in water and inserted into a hole(s) in the catalyst so that it is pressed against the head of the fracturing agent.

Another method for heating the fracturing agent is to press its head with a preheated short iron rod having a diameter only slightly smaller than the diameter of the hole in which the fracturing agent has been packed.

Also usable is a heating device of the cylindrical type shown in FIG. 3, which incorporates a hot plate 20 and has a plurality of spring-loaded rods 21 extending from both sides to support the device on the inner walls of a hole. In FIG. 3, the numeral 22 denotes a lever for manipulating the supporting rods 21 to move in the directions indicated by the arrow A. In the state that the lever 22 is pulled in the direction indicated by arrow B, the rods 21 are urged by springs to be opened toward the inner walls of the hole and are securely held thereon so that the heating device remains pressed against the head of the hydrative expansive fracturing agent throughout the fracturing operation. The hot plate 20 may be heated at a location remote from the reactor, and in this case, in order to prevent the heated plate from becoming cool before it is brought to the reactor, the hot plate may be equipped with an aluminum cap 23 having an insulator lining.

By making use of these heating methods, that portion of a hydrative expansive fracturing agent which is at the open end of a hole in the waste catalyst will expand and solidify earlier than the other portions; this solidified portion serves as a "lid" on the hole and confines the fracturing agent within the hole so that it will be hydrated and expanded without gushing out of the hole, thus providing a pressure sufficient to fracture the catalyst. The fractured catalyst may be discharged from the reactor through manholes or other suitable passages.

An example embodiment of the method of the present invention as applied to a reactor used in the direct desulfurization of heavy oil is hereunder described, by reference to the accompanying drawings.

The reactor generally indicated at 1 in FIG. 1 contains a catalyst holding tray 2, distributors plates 3a and 3b, a quench pipe 4, and protective tubes of thermocouple 5a and 5b. Upper and lower catalyst beds 6a and 6b are formed within the reactor.

The method of the present invention begins with cleaning and other necessary operations performed on the catalyst within the reactor 1. When the lids on nozzles 7a, 7b and 7c are opened, the unconsolidated portion of the waste catalyst in the lower bed flows down through the reactor, leaving the consolidated waste catalyst behind within the reactor. Holes are made in the consolidated waste catalyst with a rock drill or any other suitable drilling machine that is inserted into the reactor through nozzles 7a and 7c. The holes are made at intervals ranging from 400 to 700 mm. The preferred drilling direction is such that the hydrative expansive fracturing agent inserted into the holes will expand toward the free surfaces unimpeded by such barriers as the walls of the reactor.

After drilling holes, the hydrative expansive fracturing agent that has been thoroughly mixed with or dipped in water is inserted into the holes. In order to provide enhanced fracturing, the inserted fracturing agent is preferably compacted with a pushing rod or a like device until the holes are completely filled with a dense body of the agent.

As already mentioned, if the temperature of the waste catalyst to be treated with hydrative expansive fracturing agents is high, they will expand rapidly as a result of sudden hydration and may sometimes gush out of the holes into which they have been charged. Therefore, the fracturing agents are preferably packed into holes after the catalyst has cooled to 45° C. or below. However, insertion of the fracturing agents is possible even at catalyst temperatures of about 80° C. if the catalyst is cooled by heat pipes of the type shown in FIG. 2, wherein 10a and 10b are heat pipe units consisting of, for example, copper pipes filled with water or other heat transfer media. The heat pipes 10a and 10b extend upwardly into coolant containers 11a and 11b which are open at the top. The containers are filled with a suitable coolant, e.g. dry ice. The heat pipes are inserted into a vertical hole 9'a or oblique holes 9'b made in the consolidated waste catalyst. Thereafter, an aqueous slurry of hydrative expansive fracturing agent is provided into the holes 9'a and 9'b.

The gushing out of the fracturing agent that will otherwise occur if the waste catalyst is hot may also be prevented by heating the head of the fracturing agent immediately after its packing into holes in the catalyst, so that said head will expand and solidify faster than the other portions of the fracturing agent. This may be accomplished by pressing an air-exposed or water-dipped pyrogenic substance against the head of the packed fracturing agent, by blowing steam directly against the head of the fracturing agent, or by pressing a heated iron rod or heating device against the head of the packed fracturing agent.

The hydrative expansive fracturing agent inserted into holes in the waste catalyst by one of the methods described above will expand by hydration that progressively occurs upon standing for several minutes to ten-odd hours, and the resulting pressure of expansion is great enough to fracture the consolidated waste catalyst into small pieces that can be easily discharged out of the reactor through nozzles 7a, 7b and 7c.

After discharging the waste catalyst in the lower bed 6b, the waste catalyst in the upper bed 6a is fractured and discharged by the following procedures. First, the pipe 8 is drawn from the top of the reactor through a manhole (not shown). Operators may then enter the reactor, remove part of the distributor 3a, and make holes in the surface of the waste catalyst in the upper bed 6a by using a rock drill or any other suitable drilling machine.

A center hole 9a is drilled in a direction perpendicular to the surface of the waste catalyst and a plurality of oblique holes 9b that surround the center hole 9a are bored toward said center hole. In order to increase the efficiency of subsequent fracturing, four or eight equidistant oblique holes 9b are preferably made. The angle $\alpha$ of inclination of the holes 9b is preferably not greater than 45° with respect to the horizontal plane. If the angle $\alpha$ of inclination exceeds 45°, part of the action of expanding fracturing agent in the oblique holes 9b will be exerted upon the side walls of the reactor rather than used effectively for the purpose of fracturing the waste catalyst.

The diameters of the center hole 9a and oblique holes 9b will depend on the size of the consolidated waste catalyst and the number of holes bored in it, but they are generally selected from the range of from about 20 to 60 mm. The depth of the center hole 9a will depend on the thickness of the catalyst layer, but for the purpose of enhanced fracturing, depths in the range of from about 200 to 600 mm are usually preferred.

As in the case of operation on the catalyst in the lower bed 6b, an intimate mixture of water and hydrative expansive fracturing agent is filled into the center and oblique holes. If a large lump of consolidated waste catalyst is present in a particular area of the catalyst, operators may enter the reactor from the top through a manhole (not shown) and drill holes and fracture the catalyst by following the procedures used in fracturing the waste catalyst in the lower bed 6b.

The thus fractured waste catalyst in the upper bed 6a may be easily discharged from the reactor from the overhead manhole (not shown) or nozzles 7a, 7b and 7c.

The following Examples are provided for further illustration of the claimed method and are not to be construed as limiting the invention.

EXAMPLE 1

The catalyst beds of a direct heavy oil hydrodesulfurizing reactor (throughput: 28,000 BPSD (barrel per stream day)) during downtime were cleaned with gas oil and unconsolidated portions of the waste catalyst were withdrawn through bottom nozzles and manholes. The waste catalyst in the upper layer of the upper bed was found to have been extensively consolidated. An attempt was made to break this consolidated portion of waste catalyst with an air pick, but a very hard lump with an approximate diameter of 2.5 m could not be destroyed. Holes with a diameter of 35 mm and a depth of 600 mm were made in this lump at pitches of 400 mm. Measurements were made of the catalyst temperature at each hole. Those holes bored in areas having temperatures not higher than 40° C. were filled with cartridges of hydrative expansive fracturing agent which consisted of an expansive cement (70% MgO.CaO, 25% $(CaO)_2$.$SiO_2$, and 5% gypsum+$K_2SiF_6$) contained in a paper bag that had been thoroughly dipped in water. The cartridges were compacted with a rod 4 or 5 times so that no gap would be left in the holes. Thereafter, the opening of each hole was covered with asbestos cloth.

Heat pipes of the type shown in FIG. 2 were inserted into some of the holes made in areas of the catalyst having temperatures between 40° C. and 80° C. The container was filled with dry ice, and an aqueous slurry of the expansive cement whose formulation was the same as shown above was cast into each of the holes to fill the gap between the heat pipe and the inner walls of the whole.

About 12 hours later, the waste catalyst was found to have been fractured by the expansive cement into sufficiently small sizes to be easily withdrawn from the reactor through manholes and bottom nozzles.

EXAMPLE 2

The remainder of the holes made in the areas of the waste catalyst in the rector of Example 1 which had temperatures between 40° and 100° C. were filled with cartridges of hydrative expansive fracturing agents that were the same as those used in Example 1, but which were compacted repeatedly until the head of each cartridge sank about 10 cm below the open end of the hole. On the head of each cartridge was placed a pyrogenic substance (mainly comprised of quick lime) that was wrapped in water-permeable paper and dipped in water. The pyrogenic substance was compacted with a rod 4 or 5 times to provide intimate contact with the fracturing agent, and the opening of each hole was covered with asbestos cloth.

One hour later, the waste catalyst was found to have been fractured by the expansive cement into sufficiently small sizes to be easily withdrawn from the reactor through manholes and bottom nozzles.

COMPARATIVE EXAMPLE 1

Some of the holes made in areas in the waste catalyst in the reactor of Example 1 which had temperatures of 76° C. and 81° C. were filled with cartridges of expansive cement as in Example 1, but not with a pyrogenic substance. Six minutes and 20 seconds (76° C.) and 5 minutes (81° C.) later, the cement gushed out of the holes in the form of fine particles with a bang, failing to fracture the waste catalyst.

As will be apparent from the foregoing description, the method of the present invention allows to ensure gradual and safe fracturing of the waste catalyst in a simple manner. Since the method of the invention can be performed even if the catalyst bed is not completely cooled, the overall efficiency of consolidated waste catalyst discharging can be significantly improved by permitting early withdrawal of such catalyst.

While the invention has been described in detail and with reference to specific embodiments thereof, it will be apparent to one skilled in the art that various changes and modifications can be made therein without departing from the spirit and scope thereof.

What is claimed is:

1. A method for discharging a consolidated waste catalyst from a reactor, comprising the steps of:
   (1) making at least one hole in the catalyst;
   (2) filing said hole with a hydrative expansive fracturing agent in the presence of water;
   (3) heating the part of the agent which is at the open end of the at least one hole so that said part of the agent will expand and solidify earlier than the other portions of the fracturing agent;
   (4) leaving said catalyst to stand until it is fractured by said agent; and
   (5) discharging the fractured catalyst from the reactor.

2. A method according to claim 1, wherein said hydrative expansive fracturing agent is selected from the group consisting of a tricalcium silicate/calcium oxide mixture and a cement which is mainly composed of lime, calcium sulfoaluminate, calcined dolomite, magnesia, a normal portland cement-blast furnace slag-bauxite-gypsum mixture, an alumina cement-lime-gypsum mixture, or a calcium aluminate-lime-gypsum mixture.

3. A method according to claim 1, wherein the hole is filled with the hydrative expansive fracturing agent as the catalyst is being cooled with a heat pipe inserted through said hole.

4. A method according to claim 1, wherein that part of the hydrative expansive fracturing agent which is at the open end of the hole is heated with a heating device that has a hot plate at the tip and is also provided with supporting rods that enable the heating device to be securely held against the inner wall of the hole.

5. A method according to claim 1, wherein said hydrative expansive fracturing agent is used in the form of a material packed within a water-permeable and expandable or rupturable container.

6. A method according to claim 1, wherein that part of the hydrative expansive fracturing agent which is at the open end of the hole is heated with a pyrogenic substance packed within an air-permeable or water-permeable container.

7. A method according to claim 1, wherein that part of the hydrative expansive fracturing agent which is at the open end of the hole is heated with a hot iron rod.

8. A method according to claim 1, wherein that part of the hydrative expansive fracturing agent which is at the open end of the hole is heated with steam.

* * * * *